(12) United States Patent
Tomlinson et al.

(10) Patent No.: US 12,090,367 B2
(45) Date of Patent: Sep. 17, 2024

(54) GOGGLES

(71) Applicant: SPEEDO INTERNATIONAL LIMITED, London (GB)

(72) Inventors: Nathan Tomlinson, London (GB); Chris Johnson, London (GB); Thomas Frederick Osman, Rugby (GB)

(73) Assignee: SPEEDO INTERNATIONAL LIMITED, London (GB)

( * ) Notice: Subject to any disclaimer, the term of this patent is extended or adjusted under 35 U.S.C. 154(b) by 169 days.

(21) Appl. No.: 17/426,339

(22) PCT Filed: Jan. 29, 2020

(86) PCT No.: PCT/EP2020/052157
§ 371 (c)(1),
(2) Date: Jul. 28, 2021

(87) PCT Pub. No.: WO2020/157127
PCT Pub. Date: Aug. 6, 2020

(65) Prior Publication Data
US 2022/0107507 A1 Apr. 7, 2022

(30) Foreign Application Priority Data
Jan. 29, 2019 (GB) ...................................... 1901193

(51) Int. Cl.
*A63B 33/00* (2006.01)
*G02C 5/04* (2006.01)

(52) U.S. Cl.
CPC .......... *A63B 33/004* (2020.08); *A63B 33/006* (2020.08); *G02C 5/045* (2013.01)

(58) Field of Classification Search
CPC ... A63B 33/002; A63B 33/004; A63B 33/006; A63B 33/008; G02C 5/045
See application file for complete search history.

(56) References Cited

U.S. PATENT DOCUMENTS 5,313,671 A * 5/1994 Flory .................... A63B 33/008
351/149
5,390,373 A * 2/1995 Flory .................... A63B 33/006
2/430

(Continued)

FOREIGN PATENT DOCUMENTS

| GB | 2 460 448 | 12/2009 |
|----|-----------|---------|
| GB | 2 516 300 | 1/2015 |
| GB | 2 528 964 | 2/2016 |

OTHER PUBLICATIONS

International Search Report for PCT/EP2020/052157 dated Mar. 25, 2019.

(Continued)

*Primary Examiner* — F Griffin Hall
(74) *Attorney, Agent, or Firm* — Stephen J. Weyer, Esq.; Stites & Harbison, PLLC

(57) ABSTRACT

Protective eyewear comprising a pair of eye pieces, each defining one of two opposing inner lateral surfaces spaced by a nose bridge. At least one of the inner lateral surfaces comprises a slot for slidably and releasably engaging a locating rib provided on said nose bridge. Said slot comprises a slot locking element and said nose bridge comprises a nose bridge locking element. In a use configuration with the locating rib of the nose bridge engaged within the slot, the slot locking element and the nose bridge locking element cooperate within said slot to releasably secure the locating rib within the slot.

18 Claims, 3 Drawing Sheets

(56) References Cited

U.S. PATENT DOCUMENTS

| | | | | | |
|---|---|---|---|---|---|
| 5,650,866 | A | * | 7/1997 | Haslbeck | A63B 33/004 2/443 |
| 5,687,428 | A | * | 11/1997 | Yamamoto | A61F 9/027 351/128 |
| 5,884,339 | A | * | 3/1999 | Fukasawa | A63B 33/004 2/446 |
| 6,145,133 | A | * | 11/2000 | Sato | A63B 33/004 2/445 |
| 6,513,170 | B1 | * | 2/2003 | Chiang | A63B 33/004 2/452 |
| 6,721,963 | B1 | * | 4/2004 | Kawashima | G02C 5/06 2/446 |
| 7,730,556 | B2 | * | 6/2010 | Chou | A63B 33/004 2/445 |
| 8,042,199 | B2 | * | 10/2011 | Chiang | A63B 33/004 2/448 |
| 8,555,425 | B2 | * | 10/2013 | Keegan | A63B 33/004 2/440 |
| 9,009,872 | B2 | * | 4/2015 | Chiang | A63B 33/004 2/426 |
| 9,180,342 | B2 | * | 11/2015 | Chiang | A63B 33/004 |
| 10,206,819 | B2 | * | 2/2019 | Chiang | A63B 33/004 |
| 10,493,325 | B2 | * | 12/2019 | Chiang | A63B 71/10 |
| 10,576,333 | B2 | * | 3/2020 | Chiang | A63B 33/004 |
| 2006/0005304 | A1 | * | 1/2006 | Chou | A63B 33/004 2/426 |
| 2010/0024098 | A1 | * | 2/2010 | Chiang | A63B 33/004 2/442 |
| 2011/0004981 | A1 | | 1/2011 | Chiang | |
| 2018/0129068 | A1 | * | 5/2018 | Allione | G02C 5/045 |
| 2018/0339197 | A1 | * | 11/2018 | Chiang | A63B 33/004 |
| 2018/0364497 | A1 | * | 12/2018 | Paris | A61F 9/02 |
| 2019/0015705 | A1 | * | 1/2019 | Chiang | A63B 33/004 |
| 2019/0070464 | A1 | * | 3/2019 | Chiang | A63B 33/004 |
| 2019/0126100 | A1 | * | 5/2019 | Liang | A63B 33/004 |

OTHER PUBLICATIONS

Written Opinion of the International Searching Authority for PCT/EP2020/052157 dated Mar. 25, 2019.

Notice of Reasons for Refusal dated Oct. 17, 2023 in Japanese Patent Application No. 2021-544148.

* cited by examiner

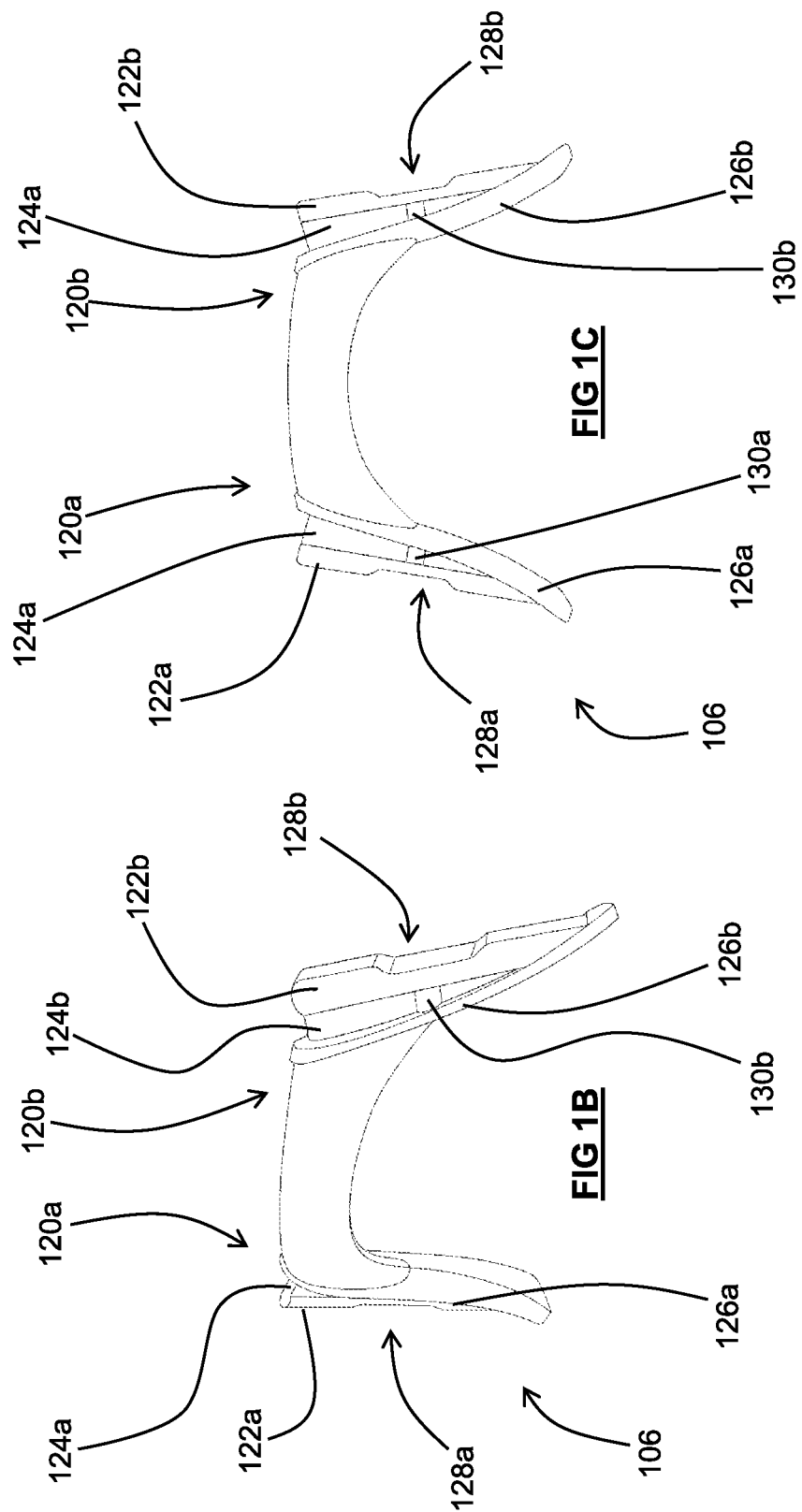

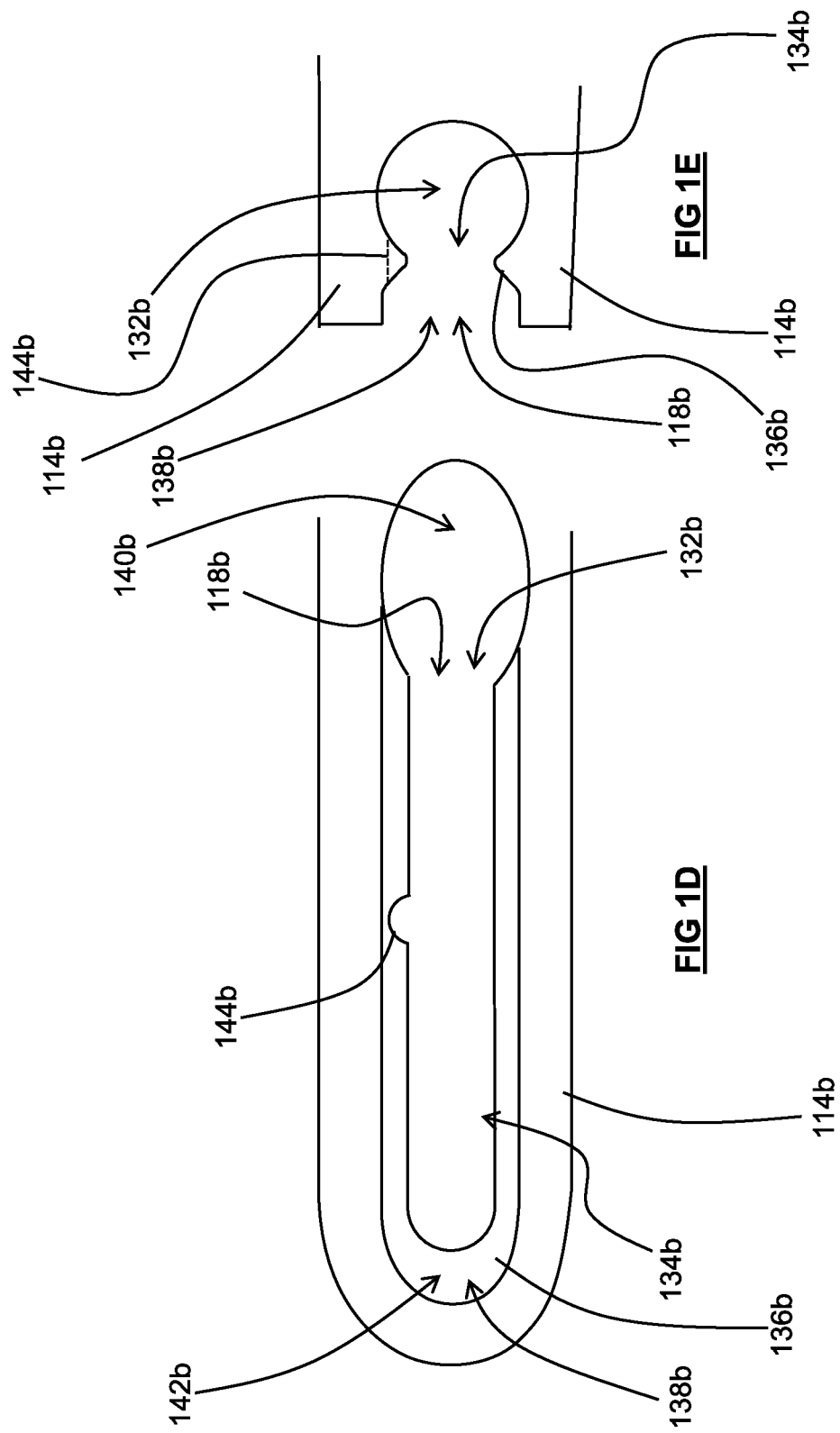

GOGGLES

FIELD OF THE INVENTION

The present invention relates to eyewear, in particular to eyewear for sporting activities such as swimming goggles.

BACKGROUND OF THE INVENTION

It is often desirable for a wearer to wear goggles to protect the wearer's eyes and/or improve vision. For example, a swimmer may wear goggles to prevent water from contacting the wearer's eyes as this can cause discomfort and impairment to the wearer's vision.

Swimming goggles typically have a pair of front lens portions that are connected by a nose bridge. Each front lens portion is surrounded by a respective gasket which extends back to, and forms a seal with, the wearer's face. The seals minimise contact between the wearer's eyes and the water.

Swimming goggles of a particular model or version are often provided in a single size. Due to variations in the size and shape of wearer's faces, this can cause issues for some wearers. For example, goggles may be uncomfortable for a wearer (due to the size of the goggles not being appropriate to the size and shape of the wearer's face). Similarly, in some cases, a wearer may be unable to obtain a proper seal between the goggles and the wearer's face.

There is a need to alleviate at least one of the issues described above.

SUMMARY OF THE INVENTION

In a first aspect, the present invention provides protective eyewear comprising a pair of eye pieces, each defining one of two opposing inner lateral surfaces spaced by a nose bridge, at least one of the inner lateral surfaces comprising a slot for slidably and releasably engaging a locating rib provided on said nose bridge, wherein said slot comprises a slot locking element and said nose bridge comprises a nose bridge locking element and wherein, in a use configuration with the locating rib of the nose bridge engaged within the slot, the slot locking element and the nose bridge locking element cooperate within said slot to releasably secure the locating rib within the slot.

By providing a nose bridge that is releasably engageable with at least one eye piece in a sliding manner, it is possible to provide a simple construction that allows for easy replacement of the nose bridge e.g. with a different sized nose bridge. Thus, a wearer may be able to select (and use) a nose bridge that is appropriate for the size and shape of the wearer's face. The provision of locking elements (i.e. the nose bridge and slot locking elements) means the nose bridge may be retained in the slot so as to avoid the nose bridge being dislodged from (releasable engagement with) the eye piece in use.

The cooperation of the nose bridge and slot locking elements within the slot (as opposed to outside of the slot) may provide for a more reliable engagement between the nose bridge and the eye piece. In some instances the nose bridge may generally be more flexible than the eye pieces (e.g. so as to allow the eyewear to adapt to a user's face). However, portions of the nose bridge that are received in the slot (e.g. the locating rib and the nose bridge locking element) may be less susceptible to flexing due to support from the (less flexible) lateral surface of the eye piece defining the slot. Hence, the provision of cooperating locking elements within (rather than outside of) the slot may mean that the locking elements are less susceptible to dislodgement due to flexing/movement of the nose bridge (e.g. in use).

The terms "inner" or "inwardly" are used herein to describe a direction extending towards the nose bridge from the eye pieces (i.e. with the nose bridge between the eye pieces). The term "upper" is used as a descriptor for a feature that is located generally towards the top of a wearer's face or head. Conversely, the term "lower" is used as a descriptor for a feature that is located generally towards the bottom of a wearer's face or head.

Optional features of the invention will now be set out. These are applicable singly or in any combination with any aspect of the invention.

In some embodiments one of the slot locking element and the nose bridge locking element may be a protrusion and the other may be a recess. The nose bridge locking element may be a protrusion and the slot locking element may be a recess. The protrusion may have a shape that is generally complementary to the shape of the recess. Thus, the protrusion may fit closely within the recess in the use configuration.

The protrusion and recess may be configured for engagement by way of snap engagement. In this respect, the protrusion and/or recess may deflect and/or deform to allow for the snap engagement. Alternatively or additionally, one or more walls defining the slot may deform and/or deflect to allow for snap engagement. For example, where the nose bridge locking element is a protrusion, the protrusion may cause one or more walls of the slot to deform/deflect as the locating rib is inserted into the slot. Once the protrusion is received in the recess, the one or more walls may return to their natural state such that the protrusion is retained in the recess. Similarly, the protrusion may deform during insertion of the locating rib into the slot and may return to its natural state once received in the recess. The snap engagement may be such that it produces a detectable feedback (i.e. to a user) when the protrusion is engaged with the recess. For example, the feedback may be in the form of a haptic feedback (e.g. a vibration detectable by touch) and/or a sound.

In some embodiments the locating rib may be spaced from a lateral end of the nose bridge by a web. The web may be thinner than the locating rib (i.e. in a direction transverse to the longitudinal axis of the locating rib). The nose bridge locking element may be provided on the web. The nose bridge locking element may be a rib extending (transversely) between the locating rib and the lateral end of the nose bridge. The transverse rib may comprise a generally semi-circular profile (i.e. in a direction of a longitudinal axis of the locating rib). In such an embodiment, the curved sides of the protrusion may facilitate release of the protrusion from the slot. The transverse rib may alternatively have a different profile e.g. a triangular profile.

The nose bridge may comprise a sealing rib. The sealing rib may have a first end connected to the lateral end of the nose bridge. The web may be interposed between the sealing rib and the locating rib so as to bridge the sealing and locating ribs. In this respect the sealing rib may be interposed between the web and the lateral and of the nose bridge. In particular, the web may be interposed between the first end of the sealing rib and a corresponding first end of the locating rib. The sealing rib may further comprise a second end connected to a corresponding second end of the locating rib opposing the first end of the locating rib. Thus, the web may have a generally triangular shape that tapers from the first ends to the second ends. The sealing rib may form an acute angle with the locating rib. The sealing rib may have a generally curved shape between its first and second ends.

In some embodiments the at least one of the inner lateral surfaces may comprise a skirt upstanding from the inner lateral surface so as to define the slot. That is, an inner surface of the skirt may define the slot. Thus the slot may be generally elongate and may extend along the inner lateral surface (e.g. between upper and lower in-use ends of the inner lateral surface). Thus the slot may define an elongate axis extending from an upper in-use end of the inner lateral surface to a lower in-use end of the inner lateral surface.

The skirt may comprise an open end to allow sliding of the locating rib into the slot (i.e. the open end may define an entrance of the slot). The open end may be a lower end of the skirt (i.e. in the use configuration). In this respect, the skirt may form an inverted "U" shape (i.e. in a plane generally parallel to the inner lateral surface). In other embodiments, the upper end of the skirt may be open. The skirt may define a blind end of the slot opposing the open end. In the use configuration (when the locating rib is received in the slot) an end of the locating rib may abut the blind end of the slot.

The height of the skirt (i.e. the extent to which the skirt upstands from the inner lateral surface) may be less at the open end compared to an opposing end of the skirt (i.e. the end of the skirt defining the blind end of the slot). That is, the height of the skirt may taper from a low point at the open end to a high point at the end opposing the open end. Thus, the slot may be shallower at the open end than at the opposing end.

The slot may comprise an innermost portion for receipt of the locating rib. The innermost portion of the slot may be elongate and may have a generally round transverse profile (i.e. transverse to a longitudinal axis of the slot). That is, the innermost portion may be defined by one or more curved (e.g. arcuate) walls of the skirt. The locating rib may have a corresponding circular profile for close fit within the slot when received therein. The slot and locating rib may alternatively have generally triangular, square, etc. transverse profiles.

In some embodiments the slot may further comprise an outermost portion (i.e. disposed outwardly of the innermost portion). The outermost portion may be defined by a distal end of the skirt and, in this respect, may comprise an elongate opening of the slot. The innermost portion and outermost portion may be separated by an internal ridge extending along an inner surface and interposed between the innermost portion and outermost portion. The internal ridge may define a narrower portion, e.g. a neck portion, of the slot (i.e. in a direction between opposing inner surfaces of the skirt). In this respect, the internal ridge may retain the locating rib in the innermost portion of the slot. That is, the internal ridge may prevent lateral movement of the locating rib out of the innermost portion of the slot.

The sealing rib (or a substantial portion thereof) may be arranged to be seated within the slot when the locating rib is received therein in the use configuration. In this way, the sealing rib may be arranged to cover (e.g. to seal) the elongate opening of the slot when seated therein. In particular, the sealing rib may be seated in the outermost portion in the use configuration (e.g. seated on the internal ridge). In the use configuration, the web may locate adjacent the internal ridge (i.e. in the narrower portion of the slot between the locating rib in the innermost portion and the sealing rib in the outermost portion). The recess (i.e. for engagement with the protrusion) may be formed in the internal ridge.

In some embodiments the sealing rib may comprise an inner lateral surface facing the nose bridge which may be arranged so as to be substantially flush (e.g. forms a generally continuous surface) with a corresponding distal end surface of skirt in the in use configuration. In this way, the inner lateral surface and corresponding distal end surface may form a hydrodynamic arrangement. That is, the inner lateral surface and corresponding distal end surface may form a generally continuous hydrodynamic outer surface of the eyewear in the use configuration In some embodiments the nose bridge may be formed of flexible plastic material. The nose bridge may, for example, be formed of nylon. The nose bridge may have a unitary form (i.e. it may be formed as a single piece).

In some embodiments the eye piece comprises a lens portion and a flexible inner gasket. The slot may be formed in extension from the lens portion. That is, the skirt may be an extension of the lens portion. An outer surface of the skirt may form a generally continuous surface with a front surface of the lens portion. The lens portion may be formed of e.g. polycarbonate. The lens portion may have a coating that provides a mirrored appearance.

In some embodiments the nose bridge may comprise two locating ribs provided respectively at opposing first and second lateral ends spaced by a bridge portion, and each of the inner lateral surfaces of the eye pieces may comprise a slot for slidably and releasably engaging a respective one of the locating ribs. Each slot may comprise a slot locking element and each of the first and second lateral ends of the nose bridge may comprise a respective nose bridge locking element.

Thus, both of the inner lateral surfaces and both lateral ends of the nose bridge may be as otherwise described above. For example, each lateral end of the nose bridge may comprise a locating rib, web and spacing rib having the various forms and arrangement as described above. Similarly, the slot and nose bridge locking elements may be as described above (e.g. a protrusion and recess). Further, each inner lateral surface may comprise a skirt upstanding around a respective slot and each skirt may comprise an internal ridge at least partially separating an innermost portion (for receipt of the locating rib) and an outermost portion (for receipt of the sealing ridge).

The protective eye wear may be in the form of swimming goggles.

In a second aspect there is provided a protective eyewear kit comprising: a plurality of nose bridges, each comprising a locating rib and a nose bridge locking element; and a pair of eye pieces, each defining one of two opposing inner lateral surfaces, at least one of the inner lateral surfaces comprising a slot for slidably and releasably engaging the locating rib of one nose bridge of the plurality of nose bridges, said slot comprising a slot locking element such that, in a use configuration with a locating rib of the nose bridge engaged within the slot, the slot locking.

In some embodiments each nose bridge may have a different shape to the other nose bridges. Each nose bridge may have a different size to the other nose bridges. Each nose bridge may be formed of a different material (or may a have different material properties) to the other nose bridges.

The eye pieces and nose bridges may be as otherwise described above with respect to the first aspect.

BRIEF DESCRIPTION OF THE DRAWINGS

Embodiments of the invention will now be described by way of example with reference to the accompanying drawings in which:

FIG. 1B is a perspective view of a nose bridge of the embodiment shown in FIG. 1A;

FIG. 1C is a front view of the nose bridge shown in FIG. 1B; and

FIGS. 1D and 1E are detail section views of a slot of the embodiment of FIG. 1A.

DETAILED DESCRIPTION AND FURTHER OPTIONAL FEATURES OF THE INVENTION

Figure 1A:
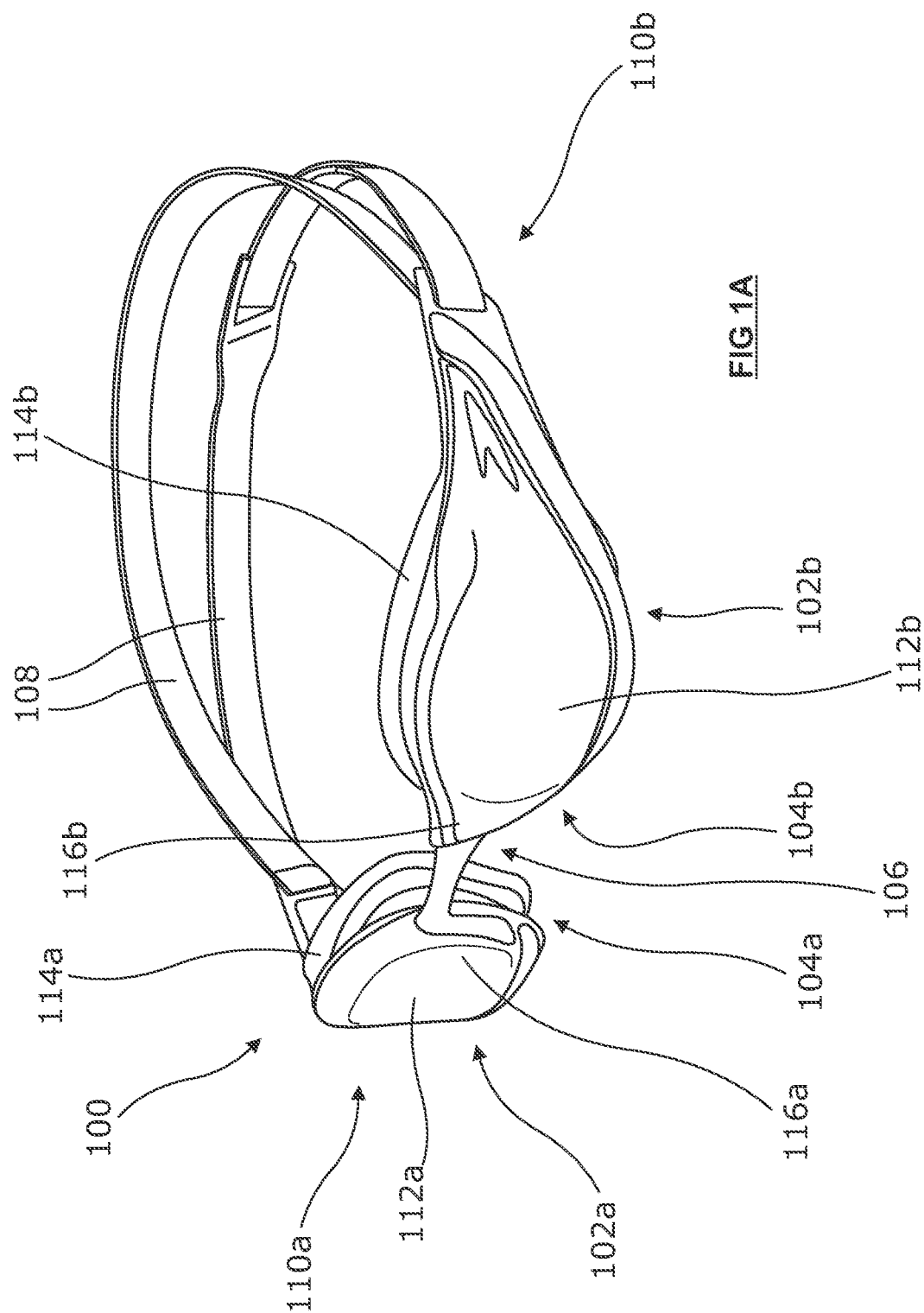
FIG. 1A is a perspective view of an embodiment of protective eye wear.

FIG. 1A illustrates protective eye wear in the form of swimming goggles 100 comprising a pair of eye pieces 102a, 102b. Each of the eye pieces 102a, 102b defines one of two opposing inner lateral surfaces 104a, 104b that are spaced by a nose bridge 106 formed of a flexible plastic material (e.g. nylon). The swimming goggles 100 further comprise a head strap 108 that loops between (and connects) outer lateral surfaces 110a, 110b of the eye pieces 102a, 102b. As should be apparent from the figure, in use, the straps 108 extend around a wearer's head so as to retain the goggles 100 on the wearer's head.

Each eye piece 102a, 102b comprises a lens portion 112a, 112b formed of a hard plastic material (e.g. polycarbonate) and a flexible inner gasket 114a, 114b (e.g. a silicone seal) that, in use, extends between a wearer's face and the lens portion 112a, 112b so as to create a seal with the wearer's face.

The eye pieces 102a, 102b each further comprise a skirt 116a, 116b upstanding from the inner lateral surface 104a, 104b of the eye piece 102a, 102b (i.e. so as to extend inwardly and laterally from the inner lateral surface 104a, 104b). In particular, the skirts 116a, 116b are integrally formed with the eye pieces 102a, 102b. Although not apparent from FIG. 1A, but as will be described in more detail below, each skirt 116a, 116b defines a slot 118a, 118b (see FIGS. 1D and 1E) for engagement with the nose bridge 106.

FIGS. 1B and 10 show the nose bridge 106 in more detail. The nose bridge 106 comprises opposing lateral ends 120a, 120b and two locating ribs 122a, 122b located at respective lateral ends 120a, 120b. Each rib 122a, 122b is generally elongate and has a generally circular profile (i.e. transverse to its longitudinal axis).

Each locating rib 122a, 122b, at a first end, is spaced (i.e. laterally) from its respective lateral end 120a, 120b of the nose bridge 106 by a web 124a, 124b. The webs 124a, 124b are thinner than the locating ribs 122a, 122b (i.e. in a direction transverse to the lateral direction). The locating rib 122a, 122b is spaced from a lateral end 120a, 120b by a central section of the nose bridge 106 by the web 124a, 124b.

The nose bridge 106 further comprise generally elongate sealing ribs 126a, 126b that are located at the lateral ends 120a, 120b and, at a first end, are each interposed between a respective lateral end 120a, 120b and a respective web 124a, 124b. Each sealing rib 126a, 126b defines a portion that is thicker (i.e. in a direction generally transverse to its longitudinal axis) than both the adjacent lateral end 120a, 120b of the nose bridge 106 and the adjacent respective web 124a, 124b.

Each sealing rib 126a, 126b generally follows a curve from its first end to a second end where it is connected to a corresponding second end of a respective locating rib 122a, 122b (i.e. opposing the first end of the locating rib 122a, 122b). Thus, each web 124a, 124b has a generally triangular shape such that it is wider at the first ends of its respective locating 122a, 122b and sealing 126a, 126b ribs (i.e. where it spaces the ribs 122a, 122b, 126a, 126b from one another) and narrows towards the second ends of the locating 122a, 122b and sealing 126a, 126b ribs.

Each locating rib 122a, 122b further comprises a notch 128a, 128b formed in an outwardly facing surface of the locating rib 122a, 122b. The notches 128a, 128b are formed generally centrally between the two ends of each locating rib 122a, 122b.

The nose bridge 106 further comprises nose bridge locking elements that are in the form of protrusions 130a, 130b projecting from each web 124a, 124b. Each protrusion 130a, 130b extends laterally between a respective locating rib 122a, 122b and sealing rib 126a, 126b generally centrally between the opposing ends of the ribs 122a, 122b, 126a, 126b. The operation of these protrusions 130a, 130b will be described in more detail below with respect to FIGS. 1D and 1E.

FIGS. 1D and 1E schematically illustrate one of the slots 118b defined by one of the skirts 116b of the goggles 100. Although only one slot 118b will be described below, it should be appreciated that both slots 118a, 118b are the same, except for their orientation (due to the slots being located on opposing inner lateral surfaces 104a, 104b of the eye pieces 102a, 102b).

FIG. 1D shows a side view of the slot 118b, whilst FIG. 1E shows a section through the skirt 114b defining the slot 118b. As is apparent from FIG. 1E in particular inner walls of the skirt 114b define the slot 118b. The slot 118b comprises an innermost portion 132b adjacent the inner lateral surface 104b. This innermost portion 132b is the portion of the slot 118b in which the locating rib 122b is received in the use configuration. In addition to the innermost portion 132b, the slot 118b comprises a neck portion 134b that forms a narrower part of the slot 118b and that is defined by an internal ridge 136b formed along an inner wall of the skirt 114b. The slot 118b further comprises an outermost portion 138b that is wider than the neck portion 134b and forms an elongate opening to the slot 118b. As is apparent from the figure, the internal ridge 136b separates the innermost portion 132b from the outermost portion 138b.

The innermost portion 132b of the slot 118b has a generally round profile (i.e. defined by arcuate walls) transverse to its longitudinal axis), such that it generally corresponds to its respective locating rib 122b of the nose bridge 106. For engagement of the eye piece 102b with the nose bridge 106, the locating rib 122b of the nose bridge 106 is received in the innermost portion 134b of the slot 118b. When the locating rib 122b is received in the innermost portion 132b of the slot 118b, the corresponding web 124b is received in the neck portion 134b of the slot 118b, between the innermost portion 132b and the outermost portion 138b. In this way, the sealing rib 126b is seated in the outermost portion 138b so as to seal the elongate opening of the slot 118b. As should be apparent from the figures, when the locating rib 122b is received in the innermost portion 132b of the slot 118b, the ridge 136b restricts movement of the locating rib 122b out of the elongate opening of the slot 118b.

As set forth above, for engagement of the eye piece 102b and the nose bridge 106, the locating rib 122b is received in the slot 118b. To allow this, the slot 118b comprises an open end 140b defining an entrance that opposes a closed (or blind) end 142b of the slot 118b. Hence, the locating rib 122b can be slid into the innermost portion 132b of the slot 118b along a longitudinal axis of the slot 118b. To help retain the locating rib 122b in the slot 118b the eye piece 102b comprises a slot locking element in the form of a recess 144b formed in the ridge 136b. When the locating rib 122b is received in the slot 118b, the protrusion 130b (located on the web 124b adjacent the locating rib 122b) locates in the recess 144b.

The width of the neck portion 134b of the slot 118b is narrower than the combined thickness of the web 124b and the protrusion 130b. Thus, as the locating rib 122b is slid into the slot 118b, the ridge 136b, walls of the skirt 114b and/or the protrusion 130b deform/deflect so as to allow passage of the web 124b and protrusion 130b along the neck portion 134b (i.e. adjacent the internal ridge 136b). Once, the protrusion 130b is received in the recess 144b, the deflected/deformed features return to their natural state so as to retain the protrusion 130b in the recess 144b. In this way, the engagement of the protrusion 130b with the locking recess 144b may be considered a snap-engagement, and a sound and/or haptic feedback (e.g. vibration) caused by the snap-engagement may indicate to a user that the nose bridge 106 and eye piece 102b are engaged.

The nose bridge 106 may subsequently be disengaged from the eye piece 102b by sliding the locating rib 122b in the opposite direction. This causes the protrusion 130b to be dislodged from the locking recess 144b and further causes the slot 118b (e.g. the ridge 136b), walls of the skirt 114b and/or the protrusion 130b to deform/deflect as the protrusion 130b moves along the neck portion 134b. The protrusion 130b has a generally semi-circular profile which facilitates dislodgement from the protrusion 130b from the recess 144b. That is, the outer curved surface of the protrusion 130b acts to guide the protrusion 130b out of the recess 144b.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

All references referred to above are hereby incorporated by reference.

The invention claimed is:

1. Protective eyewear comprising a pair of eye pieces, each defining one of two opposing inner lateral surfaces spaced by a nose bridge, at least one of the inner lateral surfaces comprising a lower in-use end configured to be located towards a ground surface when the eyewear is worn, an upper in-use end configured to be located away from the ground surface when the eyewear is worn, and a skirt upstanding from the inner lateral surface so as to define a slot for slidably and releasably engaging a locating rib provided on said nose bridge,
wherein said slot comprises a slot locking element and said nose bridge comprises a nose bridge locking element and wherein, in a use configuration with the locating rib of the nose bridge engaged within the slot, the slot locking element and the nose bridge locking element cooperate within said slot to releasably secure the locating rib within the slot; and
wherein said slot is elongate and extends along the inner lateral surface between the upper and lower in-use ends of the inner lateral surface, an end of the skirt being open so as to allow sliding of the locating rib into the slot along an axis that extends from the upper in-use end of the inner lateral surface to the lower in-use end of the inner lateral surface.

2. The protective eyewear according to claim 1 wherein one of the slot locking element and the nose bridge locking element is a protrusion and the other is a recess.

3. The protective eyewear according to claim 1 wherein the locating rib is spaced from a lateral end of a central section of the nose bridge by a web.

4. The protective eyewear according to claim 3 wherein the nose bridge locking element is provided on the web.

5. The protective eyewear according to claim 4 wherein the nose bridge locking element is a rib extending between the locating rib and the lateral end of the central section of the nose bridge.

6. The protective eyewear according to claim 1 wherein the open end of the skirt is a lower end of the skirt.

7. The protective eye wear according to claim 1 wherein the nose bridge comprises a sealing rib arranged to be seated within the slot when the locating rib is received therein in the use configuration.

8. The protective eye wear according to claim 7 wherein the slot comprises:
an innermost portion for receipt of the locating rib;
an outermost portion defined by a distal end of the skirt and in which the sealing rib is seated in the use configuration; and
wherein the skirt comprises an internal ridge interposed between, and at least partially separating, the innermost portion and outermost portion.

9. The protective eye wear according to claim 7 wherein the sealing rib comprises:
a first end connected to the lateral end of the central section of the nose bridge, the web interposed between the first end of the sealing rib and a corresponding first end of the locating rib; and
a second end opposing the first end and connected to a corresponding second end of the locating rib.

10. The protective eyewear according to claim 7 wherein the sealing rib comprises an inner lateral surface facing the nose bridge, the inner lateral surface arranged so as to be substantially flush with a corresponding distal end surface of the skirt in the use configuration.

11. The protective eyewear according to claim 10 wherein the inner lateral surface and corresponding distal end surface form a generally continuous hydrodynamic outer surface of the eyewear in the use configuration.

12. The protective eyewear according to claim 1 wherein the nose bridge is formed of a flexible plastic material.

13. The protective eyewear according to claim 1 wherein the eye piece has a lens portion and a flexible inner gasket, and wherein the slot is formed in an extension of the lens portion.

14. The protective eyewear according to claim 1 wherein the slot locking element and nose bridge locking element are configured to cooperate by snap-engagement with one another.

15. The protective eyewear according to claim 14 wherein the snap-engagement is such that it produces a user-detectable feedback.

16. The protective eyewear according to claim 1 wherein the nose bridge comprises two locating ribs provided respectively at opposing first and second lateral ends and spaced by a bridge portion, and each of the inner lateral surfaces of the eye pieces comprises a slot for slidably and releasably engaging a respective one of the locating ribs, wherein each slot comprises a slot locking element and each of the first and second lateral ends of the nose bridge comprises a respective nose bridge locking element.

17. The protective eyewear according to claim 1 wherein the open end of the skirt is disposed on a surface of the skirt configured to face downwardly toward the ground surface when the eyewear is worn.

18. A protective eyewear kit comprising:
a plurality of nose bridges, each comprising a locating rib and a nose bridge locking element, and
a pair of eye pieces, each defining one of two opposing inner lateral surfaces, at least one of the inner lateral surfaces comprising a lower in-use end configured to be located towards a ground surface when the eye pieces are worn, an upper in-use end configured to be located away from the ground surface when the eye pieces are worn, and a skirt upstanding from the inner lateral surface so as to define a slot for slidably and releasably engaging the locating rib of one nose bridge of the plurality of nose bridges, said slot comprising a slot locking element such that, in a use configuration with the locating rib of the nose bridge engaged within the slot, the slot locking element and the nose bridge locking element cooperate within said slot to releasably secure the locating rib within the slot;
wherein said slot of the at least one inner lateral surface is elongate and extends along the inner lateral surface between the upper and lower in-use ends of the inner lateral surface, an end of the skirt being open so as to allow sliding of the locating rib into the slot along an axis that extends from the upper in-use end of the inner lateral surface to the lower in-use end of the inner lateral surface.

* * * * *